Feb. 14, 1956 W. KERNICKI 2,734,624

SPARE KEY HOLDER

Filed Dec. 31, 1952

INVENTOR
Walter Kernicki

BY John S. Braddock
ATTORNEY

United States Patent Office 2,734,624

Patented Feb. 14, 1956

2,734,624

SPARE KEY HOLDER

Walter Kernicki, Grand Rapids, Mich.

Application December 31, 1952, Serial No. 329,065

1 Claim. (Cl. 206—38)

The present invention relates to a spare key holder.

The primary objects of the invention are to provide a spare key holder adapted to hold the owner's spare house key and spare automobile key, said holder being in the form of a relatively flat card of the same general dimensions as those of an identification card, whereby the owner may insert the card with the keys thereon in his wallet or purse and simply forget about them until such time as an emergency need for them arises, it being presumed that in all likelihood the owner will have his wallet safely in his possession even though he might have exercised somewhat less care in the retention of his keys; to provide such a key holder in which is incorporated indicia identifying each of the spare keys mounted thereon; to provide means on the key holding card whereby inadvertent removal of the keys from the card is prevented; and to provide such a device which may relatively inexpensively be molded of plastic material in attractive form.

An illustrative embodiment of the invention is shown in the accompanying drawing, wherein.

Figure 1:
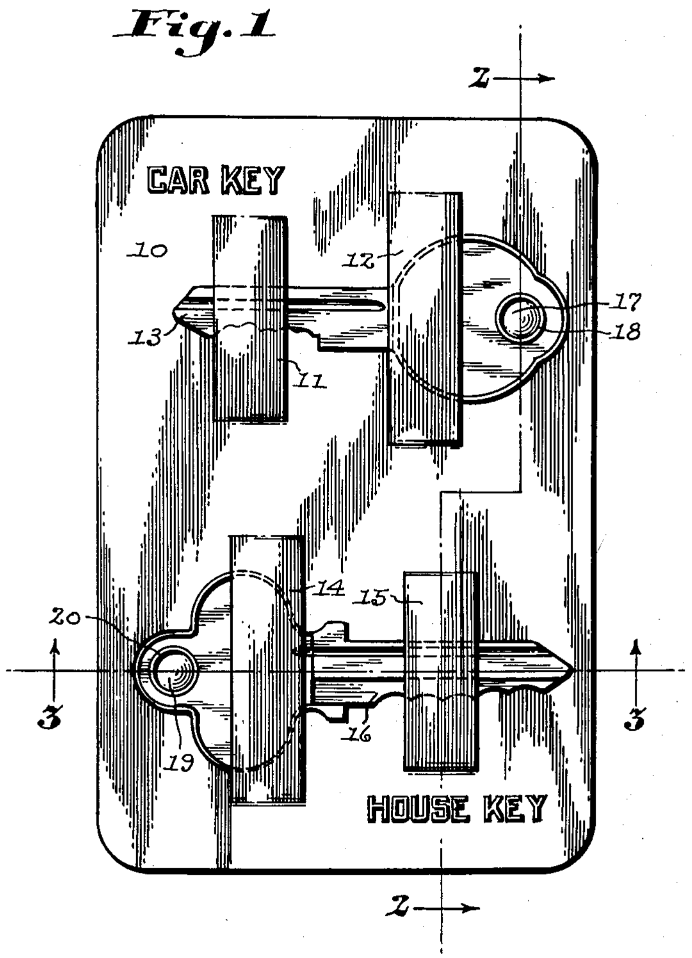
Figure 1 is an elevational view of the new spare key holding card with keys in position thereon.
Figure 2:
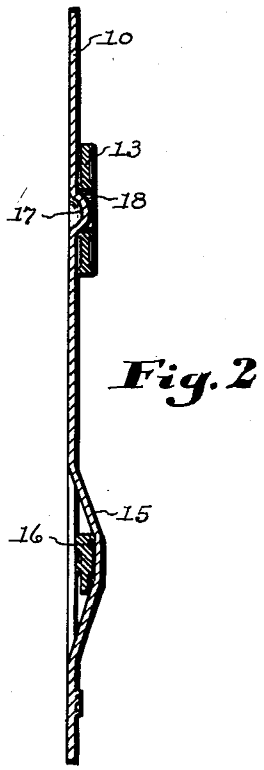
Figure 2 is a sectional view of the same taken on line 2—2 of Figure 1.
Figure 3:
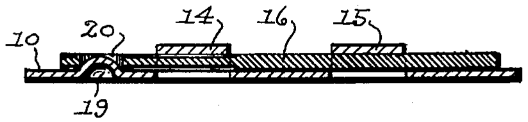
Figure 3 is a sectional view of the same taken on line 3—3 of Figure 1.

Referring now in detail to this drawing wherein the various parts are designated by the same numerals in the several views, the spare key holder there shown may be of any suitable material either molded, die-cut or otherwise formed. It is desirably made of molded plastic and is in the form of a card 10 preferably of identification card size and thus receivable in a conventional wallet or other identification card holder. The card is provided with a plurality of slits therethrough arranged in pairs to provide straps, there being a pair of parallel straps 11, 12 for the reception of a car key 13 and another pair of straps 14, 15 for the reception of a house key 16. The keys 13 and 16 are inserted through their respective slits with the card on one side of the keys and with the straps on the other side of the keys for thus holding the keys in position on the card.

Means are provided for preventing inadvertent removal of the keys from the card, such means comprising a pair of projections molded on the card or, if the card be die-stamped, "dimpled" therein. The projection 17 is in alignment with the middles of the straps 11, 12 and is adapted for engagement with the keyring hole 18 of the car key 13, whereas the projection 19 is in alignment with the middles of the straps 14, 15 and is adapted for engagement with the keyring hole 20 of the house key 16. It will be seen that when the keys are snapped into position on the card, they will be prevented from accidental displacement by the engagement of these projections 17 and 19 with the keyring holes of the car key and the house key respectively.

Also molded or otherwise inscribed in the card are identifying indicia associated with the positions for the keys. Thus the indicia "Car Key" identifies the car key adjacent thereto while the indicia "House Key" identifies the house key adjacent thereto.

It is contemplated that the spare key holders be molded in assorted colors thus to enhance their merchandising appeal, and thus also providing a means for distinguishing the spare key holders which might belong to different members of the same family.

It will thus be seen that the invention provides an attractive and convenient device whereby its owner may always have in his possession a set of spare keys, and while but one specific embodiment of the invention has been herein shown and described, it will be understood that numerous details may be altered or omitted without departing from the spirit of the invention as the same is defined by the following claim.

I claim:

In a spare key holder: a relatively flat card provided with a plurality of slits therethrough arranged to provide a pair of straps for an automobile key and another pair of straps for a house key, the keys being inserted through the slits with the card on one side thereof and the straps on the other side thereof for holding the keys in position on the card, said card being made of molded plastic, projections molded on the card in alignment with the middles of the pairs of straps respectively for engagement in the keyring holes of the keys whereby inadvertent removal of the keys from the card is prevented, and indicia molded on the card for designating the key spaces for the automobile key and the house key respectively, said key holder being of semi-rigid, slightly springable material whereby the keys are sprung into position on the card and thereafter snugly embraced between the straps and the card with said projections seated in the keyring holes of the keys respectively.

References Cited in the file of this patent

UNITED STATES PATENTS

| | | |
|---|---|---|
| 649,485 | Schmetz | May 15, 1900 |
| 979,307 | Hutchings | Dec. 20, 1910 |
| 1,407,792 | Hatzung | Feb. 28, 1922 |
| 1,999,660 | Mosely et al. | Apr. 30, 1935 |
| 2,112,339 | Kasparek | Mar. 29, 1938 |
| 2,122,934 | Economakis | July 5, 1938 |
| 2,208,372 | Kirkpatrick | July 16, 1940 |
| 2,247,252 | Price | June 21, 1941 |
| 2,484,627 | Lennox | Oct. 11, 1949 |
| 2,578,444 | Nicolle | Dec. 11, 1951 |

FOREIGN PATENTS

| | | |
|---|---|---|
| 259,277 | Switzerland | June 16, 1949 |